(12) United States Patent
Kurronen et al.

(10) Patent No.: US 11,251,667 B2
(45) Date of Patent: Feb. 15, 2022

(54) PERMANENT MAGNET MODULES FOR AN ELECTRIC MACHINE HAVING AXIALLY AND CIRCUMFERENTIALLY OFFSET PERMANENT MAGNET ELEMENTS, A ROTOR, PERMANENT MAGNET ELECTRIC MACHINE, AND A METHOD FOR ASSEMBLING THEREOF

(71) Applicant: The Switch Drive Systems Oy, Lappeenranta (FI)

(72) Inventors: Panu Kurronen, Lappeenranta (FI); Tuomas Akseli Pihlaja, Virolahti (FI)

(73) Assignee: THE SWITCH DRIVE SYSTEMS OY, Lappeenranta (FI)

( * ) Notice: Subject to any disclaimer, the term of this patent is extended or adjusted under 35 U.S.C. 154(b) by 248 days.

(21) Appl. No.: 16/544,329

(22) Filed: Aug. 19, 2019

(65) Prior Publication Data

US 2020/0083765 A1    Mar. 12, 2020

(30) Foreign Application Priority Data

Sep. 12, 2018   (FI) .................................... 20185758

(51) Int. Cl.
- *H02K 1/28* (2006.01)
- *H02K 1/27* (2022.01)
- *H02K 15/03* (2006.01)

(52) U.S. Cl.
CPC ................. *H02K 1/28* (2013.01); *H02K 1/27* (2013.01); *H02K 1/274* (2013.01); *H02K 1/278* (2013.01); *H02K 15/03* (2013.01)

(58) Field of Classification Search
CPC .. H02K 1/06; H02K 1/22; H02K 1/27; H02K 1/2706; H02K 1/272; H02K 1/2726;
(Continued)

(56) References Cited

U.S. PATENT DOCUMENTS 5,914,552 A * 6/1999 Hsu ...................... H02K 1/278
                                                       310/156.18
6,481,090 B1   11/2002 Franco et al.
(Continued)

FOREIGN PATENT DOCUMENTS

EP       2348612 A1    7/2011
EP       2523316 A1    11/2012
(Continued)

OTHER PUBLICATIONS

Finnish Search Report issued in Application No. 20185758, dated Apr. 3, 2019.
(Continued)

*Primary Examiner* — Jue Zhang
*Assistant Examiner* — David A. Singh
(74) *Attorney, Agent, or Firm* — Birch, Stewart, Kolasch & Birch, LLP

(57) ABSTRACT

Each permanent magnet module for a permanent magnet rotor includes a base-plate and a permanent magnet element attached to the base-plate. The base-plate includes a bottom section and an upper section between the bottom section and the permanent magnet element. The permanent magnet modules constitute subsets so that permanent magnet modules of different subsets differ from each other by positions of the upper sections of the base-plates with respect to the bottom sections of the base-plates so that the permanent magnet elements of the permanent magnet modules of the different subsets are axially successive and circumferentially shifted when the bottom sections of these permanent magnet modules are axially successive and circumferentially aligned. Thus, the permanent magnet elements of the permanent magnet modules can be arranged into, for example, skewed rows on a surface of the rotor.

14 Claims, 6 Drawing Sheets

(58) Field of Classification Search
CPC .......... H02K 1/274; H02K 1/278; H02K 1/28; H02K 15/02; H02K 15/03; H02K 21/12; H02K 21/14
See application file for complete search history.

(56) References Cited

U.S. PATENT DOCUMENTS

| | | | |
|---|---|---|---|
| 2006/0163969 A1 | 7/2006 | Nemoto et al. | |
| 2007/0290564 A1* | 12/2007 | Clark | H02K 1/278 310/156.29 |
| 2009/0224627 A1 | 9/2009 | Hino et al. | |
| 2011/0175480 A1* | 7/2011 | Booth | H02K 1/278 310/156.13 |
| 2011/0285216 A1* | 11/2011 | Kurronen | H02K 1/28 310/45 |
| 2014/0084593 A1* | 3/2014 | Muniz Casais | H02K 1/27 290/55 |
| 2015/0028709 A1* | 1/2015 | Ueda | H02K 1/2706 310/156.19 |
| 2015/0042099 A1* | 2/2015 | Muniz Casais | H02K 1/28 290/55 |
| 2016/0164355 A1* | 6/2016 | Diaz Diaz | H02K 3/12 310/156.54 |
| 2016/0315512 A1* | 10/2016 | Fubuki | H02K 21/16 |
| 2017/0012510 A1* | 1/2017 | Hattori | H02K 1/27 |
| 2017/0040853 A1* | 2/2017 | Totaro | H02K 29/03 |
| 2019/0363594 A1* | 11/2019 | Qin | H02K 1/278 |

FOREIGN PATENT DOCUMENTS

| | | |
|---|---|---|
| EP | 2555393 A1 | 2/2013 |
| EP | 2 830 192 A2 | 1/2015 |
| WO | WO 2010/070196 A1 | 6/2010 |

OTHER PUBLICATIONS

European Search Report, dated Jan. 10, 2020, for European Application No. 19191425.8.

* cited by examiner

PERMANENT MAGNET MODULES FOR AN ELECTRIC MACHINE HAVING AXIALLY AND CIRCUMFERENTIALLY OFFSET PERMANENT MAGNET ELEMENTS, A ROTOR, PERMANENT MAGNET ELECTRIC MACHINE, AND A METHOD FOR ASSEMBLING THEREOF

FIELD OF THE DISCLOSURE

The disclosure relates generally to a permanent magnet electric machine that can be, for example but not necessarily, a generator of a wind power plant. More particularly, the disclosure relates to permanent magnet modules for a rotor of a permanent magnet electric machine. Furthermore, the disclosure relates to a rotor of a permanent magnet electric machine. Furthermore, the disclosure relates to a permanent magnet electric machine. Furthermore, the disclosure relates to a method for assembling a permanent magnet electric machine.

BACKGROUND

An inherent advantage of a permanent magnet electric machine is a good efficiency because permanent magnets generate magnetic field without losses in contrast to electromagnets. On the other hand, permanent magnet electric machines are not free from challenges. One of the challenges is related to magnetic forces which are generated by permanent magnets and which complicate installation of a rotor of a permanent magnet electric machine. In conjunction with large permanent magnet electric machines where the magnetic forces are strong, a rotor is often installed without permanent magnets. A body part of the rotor may comprise for example axially directed fastening rails with the aid of which permanent magnet modules can be slid in the axial direction into their final positions on a surface of the body part after the body part has been arranged to be supported by bearings with respect to a stator. The axially directed fastening rails may have for example a T-shaped cross-section so that the leg of the T-shaped cross-section is perpendicular to the surface of the body part, and the permanent magnet modules may have portions that are pressed by the axially directed fastening rails against the body part when the axially directed fastening rails are tightened towards the body part. The rotor may comprise for example bolts or threaded rods extending radially through the body part to the axially directed fastening rails and suitable for pulling the axially directed fastening rails towards the body part.

The above-described method for assembling a rotor of a permanent magnet electric machine is not free from challenges. One of the challenges is that the above-described method leads inherently to a construction where permanent magnet modules are arranged in axially directed straight rows on a surface of a body part of a rotor. For example, to reduce cogging torque and/or voltage harmonics, there can be a need to deviate from the above-mentioned construction where the permanent magnet modules are arranged in the axially directed straight rows. Instead, there can be a need to arrange the permanent magnet modules into rows that are skewed with respect to the axial direction or into rows that otherwise deviate from axially directed straight rows.

SUMMARY

The following presents a simplified summary to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying and non-limiting embodiments.

In accordance with the invention, there are provided new permanent magnet modules for a rotor of a permanent magnet electric machine. The permanent magnet electric machine can be, for example but not necessarily, a direct driven wind generator.

Each of the above-mentioned permanent magnet modules comprises a base-plate and a permanent magnet element attached to the base-plate. The base-plate comprises a bottom section and an upper section between the bottom section and the permanent magnet element. The permanent magnet modules constitute at least three subsets of the permanent magnet modules so that the permanent magnet modules of different ones of the subsets differ from each other by positions of the upper sections of the base-plates with respect to the bottom sections of the base-plates so that the permanent magnet elements of the permanent magnet modules of different ones of the subsets are axially successive and circumferentially at different positions when the bottom sections of these permanent magnet modules are axially successive and circumferentially aligned with each other on a surface of a body part of a rotor.

The above-described permanent magnet modules make it possible to construct a rotor where the above-mentioned permanent magnet elements and the upper sections of the base-plates are arranged into a pattern that deviates from axially directed straight rows, but where the bottom sections of the base-plates are arranged into axially directed straight rows. For example, the permanent magnet elements and the upper sections of the base-plates can be arranged into rows skewed with respect to the axial direction while the bottom sections of the base-plates are arranged into axially directed straight, i.e. non-skewed, rows. As the bottom sections of the base-plates that are attached to the body part are arranged into axially directed straight rows, neither the assembly of the rotor nor the fastening of the permanent magnet modules is complicated.

In accordance with the invention, there is provided also a new rotor for a permanent magnet electric machine. A rotor according to the invention comprises:
 a body part having a shaft, and
 permanent magnet modules according to the invention on a surface of the body part.

In the rotor according to the invention, the permanent magnet elements of the permanent magnet modules are arranged into rows extending in the axial direction of the rotor and deviating from the axial direction of the rotor, and the bottom sections of the permanent magnet modules are arranged into axially directed straight rows.

In accordance with the invention, there is provided also a new permanent magnet electric machine that comprises a rotor according to the invention and a stator, wherein the rotor is rotatably supported with respect to the stator.

In accordance with the invention, there is provided also a new method for assembling a permanent magnet electric machine. The method comprises:
 installing a body part of a rotor of the permanent magnet electric machine on an operational position where a surface of the body part faces radially towards an airgap surface of a stator of the permanent magnet electric machine, and subsequently sliding, in an axial direction of the rotor and along the surface of the body part, permanent magnet modules according to the invention to operational positions of the permanent magnet modules so that the permanent magnet elements of the permanent magnet modules are arranged into rows extending in the axial direction of the rotor and deviating from the axial direction of the rotor, and the bottom sections of the permanent magnet modules are arranged into axially directed straight rows, and attaching the permanent magnet modules to the body part.

Exemplifying and non-limiting embodiments are described in accompanied dependent claims.

Various exemplifying and non-limiting embodiments both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of also un-recited features. The features recited in the accompanied dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

Exemplifying and non-limiting embodiments and their advantages are explained in greater detail below with reference to the accompanying drawings, in which.

DESCRIPTION OF EXEMPLIFYING AND NON-LIMITING EMBODIMENTS

The specific examples provided in the description below should not be construed as limiting the scope and/or the applicability of the accompanied claims. Lists and groups of examples provided in the description are not exhaustive unless otherwise explicitly stated.

Figure 1A:
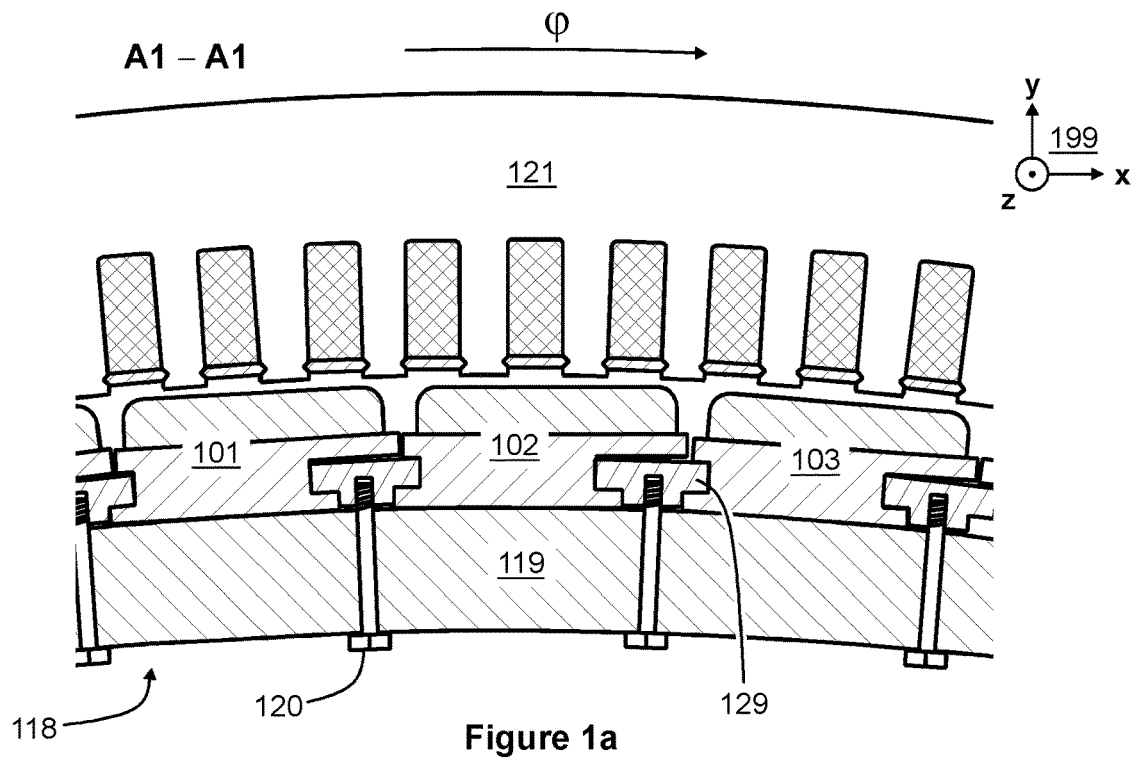
FIGS. 1a-1f illustrate a permanent magnet electric machine according to an exemplifying and non-limiting embodiment.
Figure 1B:
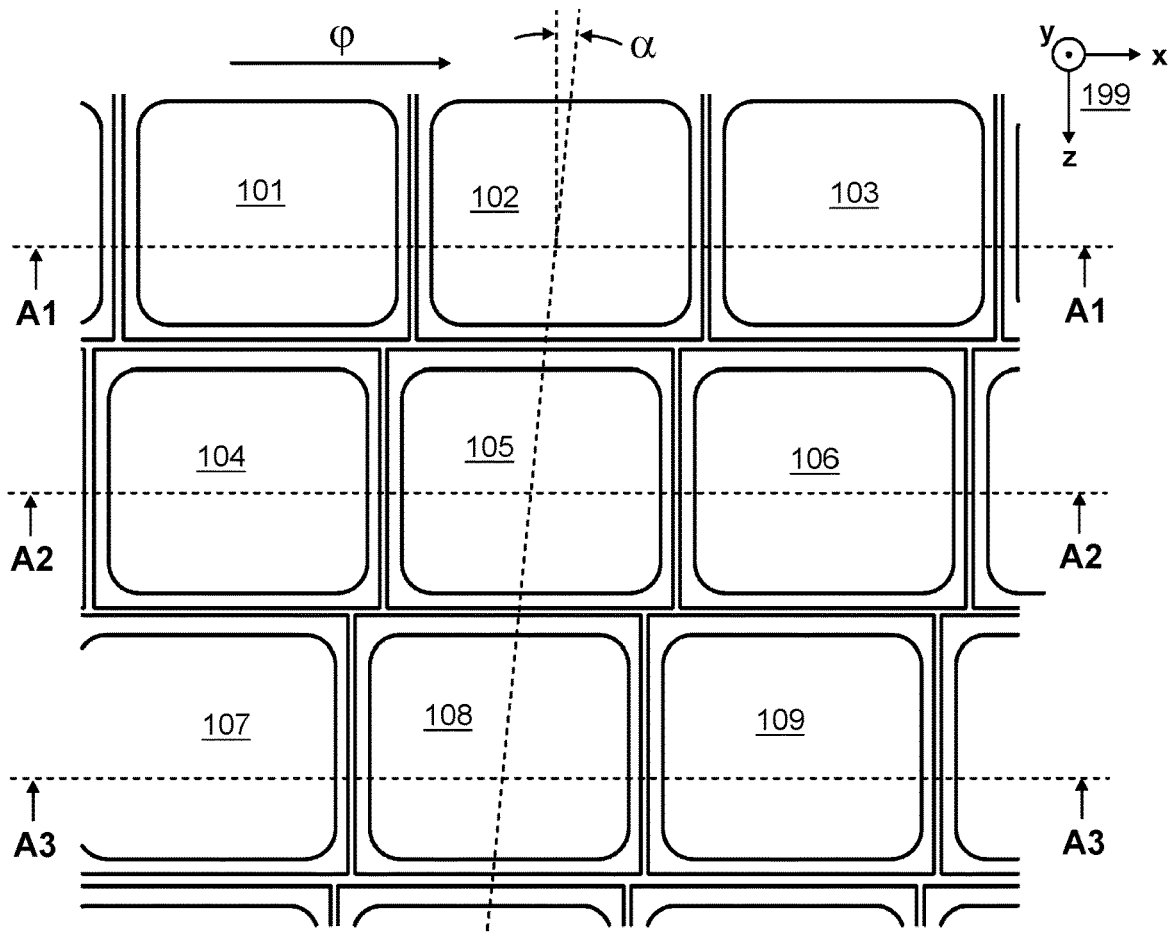
Figure 1C:
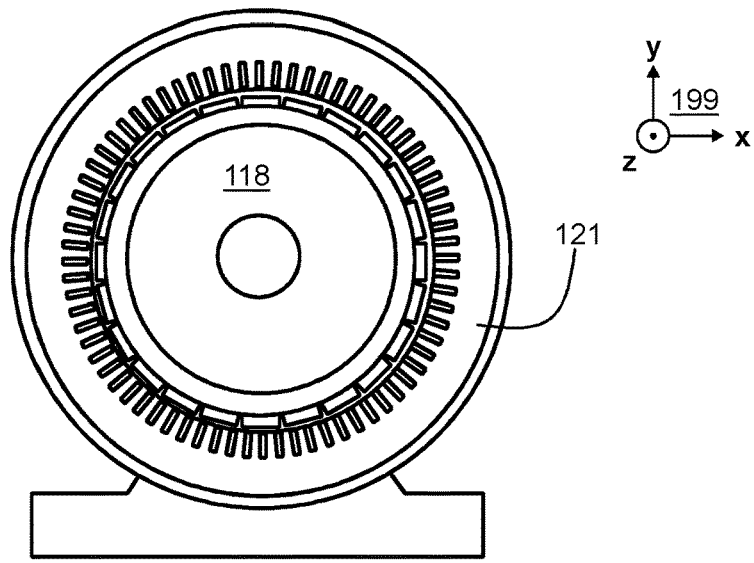
Figure 1D:
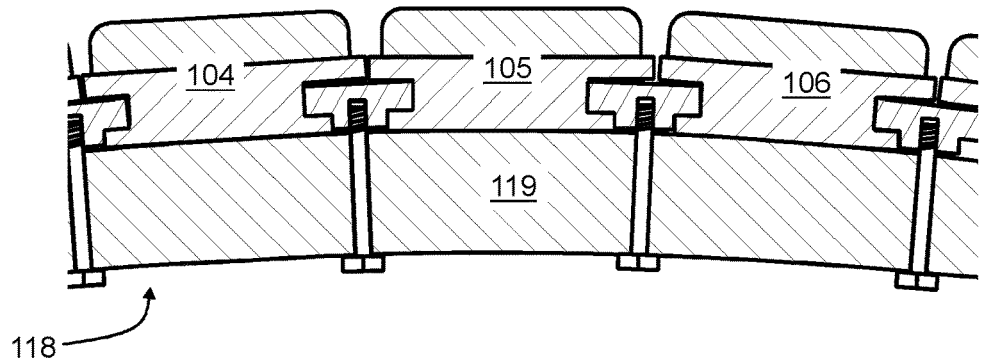
Figure 1E:
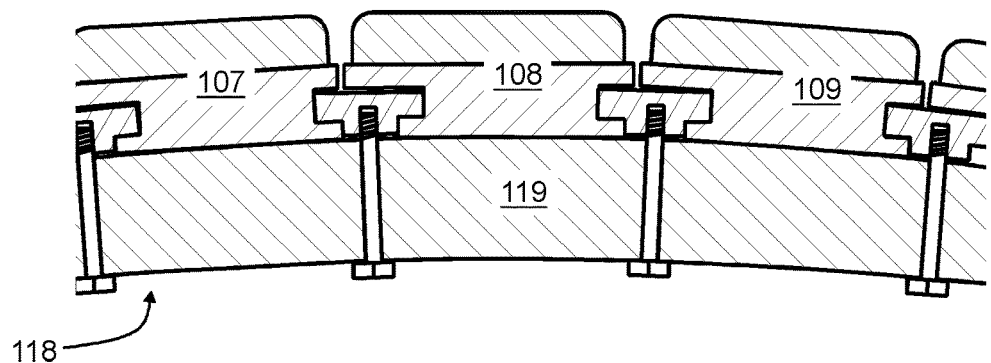

FIG. 1a shows a section view of a part of a permanent magnet electric machine according to an exemplifying and non-limiting embodiment. The section is taken along a line A1-A1 shown in FIG. 1b and the section plane is parallel with the xy-plane of a coordinate system 199. FIG. 1b shows a part of a rotor 118 of the permanent magnet electric machine when seen along a radial direction towards an airgap surface of the rotor. FIG. 1c shows schematically the permanent magnet electric machine so that a stator 121 of the permanent magnet electric machine is presented as a section view, but the rotor 118 is not presented as a section view. FIG. 1d shows a view of a section taken along a line A2-A2 shown in FIG. 1b, and FIG. 1e shows a view of a section taken along a line A3-A3 shown in FIG. 1b. The section planes related to FIGS. 1d and 1e are parallel with the xy-plane of the coordinate system 199.

Figure 1F:
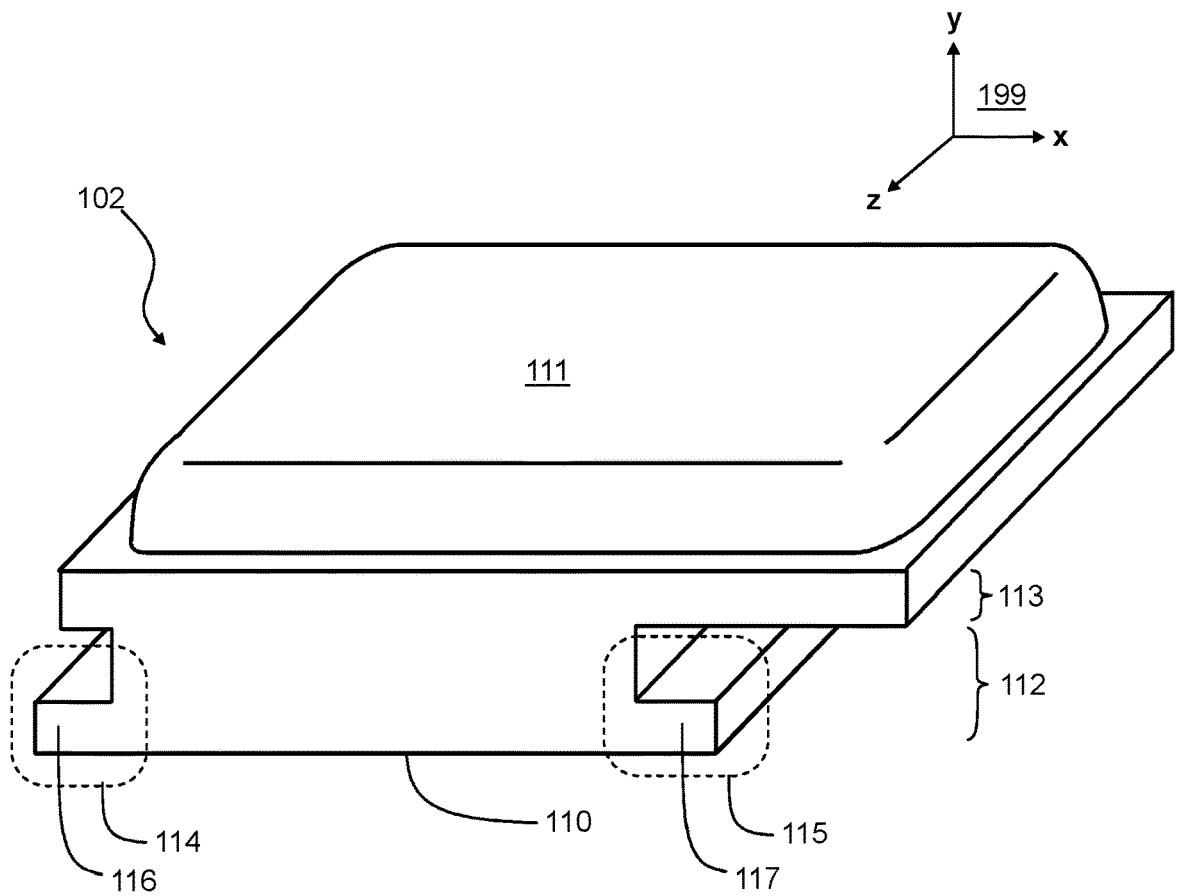
Figure 1F:
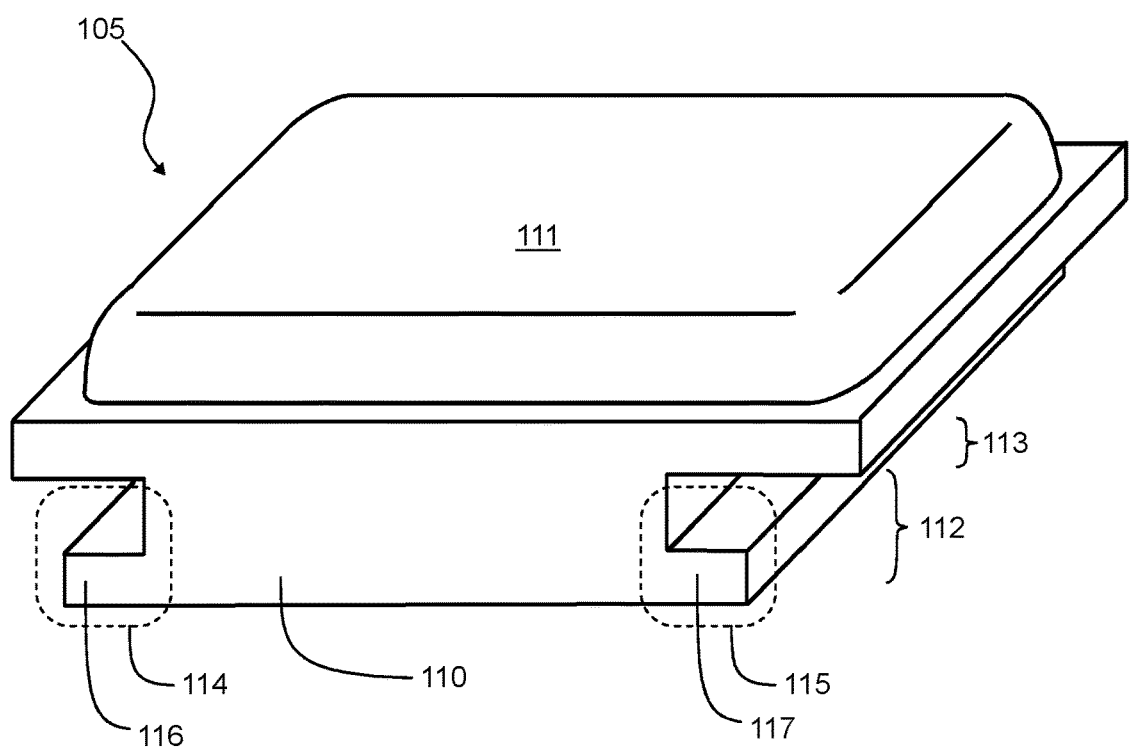

The rotor 118 is rotatably supported with respect to the stator 121 with a bearing system that is not shown in FIGS. 1a-1e. The rotor 118 comprises a body part 119 that comprises a shaft. The rotor 118 comprises permanent magnet modules mounted on a surface of the body part 119. In FIGS. 1a, 1b, 1d, and 1e, some of the permanent magnet modules are denoted with references 101, 102, 103, 104, 105, 106, 107, 108, and 109. The permanent magnet modules 102 and 105 are shown in FIG. 1f.

Each of the permanent magnet modules comprises a base-plate and a permanent magnet element attached to the base-plate. In FIG. 1f, the base-plates of the permanent magnet modules 102 and 105 are denoted with a reference 110 and the permanent magnet elements of the permanent magnet modules 102 and 105 are denoted with a reference 111. The direction of magnetization of the permanent magnet elements 111 is parallel with the y-axis of the coordinate system 199. Thus, the permanent magnet elements of the permanent magnet modules shown in FIGS. 1a, 1b, 1d, and 1e have radial directions of magnetization. Each permanent magnet element can be for example a single piece of permanent magnet material that is attached, e.g. with glue, on a surface of the base-plate. It is also possible that a permanent magnet element comprises a casing inside which there are one or more pieces of permanent magnet material. It is worth noting that permanent magnet elements of various kinds are possible in conjunction with the permanent magnet modules under consideration.

The base-plate of each permanent magnet module comprises a bottom section and an upper section between the bottom section and the permanent magnet element of the permanent magnet module. In FIG. 1f, the bottom sections of the permanent magnet modules 102 and 105 are denoted with a reference 112 and the upper sections of the permanent magnet modules 102 and 105 are denoted with a reference 113. The permanent magnet modules constitute subsets of permanent magnet modules so that permanent magnet modules of different ones of the subsets differ from each other by positions of the upper sections of the base-plates with respect to the bottom sections of the base-plates. In the exemplifying permanent magnet electric machine illustrated in FIGS. 1a-1e, the permanent magnet modules 101-103 belong to a first subset, the permanent magnet modules 104-105 belong to a second subset, and the permanent magnet modules 107-109 belong to a third subset. Thus, the permanent magnet modules 102 and 105 shown in FIG. 1f belong to different subsets. As shown in FIG. 1f, these permanent magnet modules 102 and 105 differ from each other by the positions of the upper sections 113 of the base-plates 110 with respect to the bottom sections 112 of the base-plates 110. Each base-plate can be for example a single piece of steel or other suitable material. It is however also possible that a base-plate is composed of e.g. two pieces of steel or other suitable material.

In the exemplifying permanent magnet electric machine illustrated in FIGS. 1a-1e, the rotor 118 comprises axially directed fastening rails located on the surface of the body part 119. The axial direction is parallel with the z-axis of the coordinate system 199. In FIG. 1a, one of the axially directed fastening rails is denoted with a reference 129. In this exemplifying case, each of the axially directed fastening rails has a T-shaped cross-section so that the leg of the T-shaped cross-section is perpendicular to the surface of the body part 119. The rotor 118 comprises threaded elements extending radially through the body part 119 to the axially directed fastening rails. In FIG. 1a, one of the threaded elements is denoted with a reference 120. In this case, the threaded elements are bolts but as well they could be threaded rods with nuts. The threaded elements are suitable for pulling the axially directed fastening rails towards the body part 119. The bottom sections of the permanent magnet modules are shaped so that the permanent magnet modules are shape-locked in radial and circumferential directions by the axially directed fastening rails. In FIGS. 1a and 1b, the circumferential direction is depicted with an arrow φ. When the threaded elements are loose i.e. not tightened, the permanent magnet modules can be slid in the axial direction along the axially directed fastening rails. Thus, the permanent magnet modules can be installed by sliding the permanent magnet modules axially along the axially directed fastening rails on the surface of the body part 119 after the body part 119 has been installed on its operational position with respect to the stator 121. Thereafter, the permanent magnet modules can be attached to the body part 119 by tightening the threaded elements resulting in a situation in which the axially directed fastening rails press the permanent magnet modules against the body part 119.

As shown in the section views shown in FIGS. 1a, 1d, and 1e, the bottom sections of the permanent magnet modules 101, 104, and 107 are aligned with each other in the circumferential direction. Correspondingly, the bottom sections of the permanent magnet modules 102, 105, and 108 are aligned with each other in the circumferential direction, and the bottom sections of the permanent magnet modules 103, 106, and 109 are aligned with each other in the circumferential direction. As the permanent magnet modules 101-103 differ from the permanent magnet modules 104-105 by the positions of the upper sections of the base-plates with respect to the bottom sections of the base-plates and correspondingly the permanent magnet modules 104-106 differ from the permanent magnet modules 107-109 in the above-mentioned way, the permanent magnet elements of the permanent magnet modules are not arranged into axially directed straight rows. In this exemplifying case, the permanent magnet elements of the permanent magnet modules are arranged into rows extending in the axial direction so that the rows are skewed with respect to the axial direction by a skewing angle α that is shown in FIG. 1b.

Figure 2A:
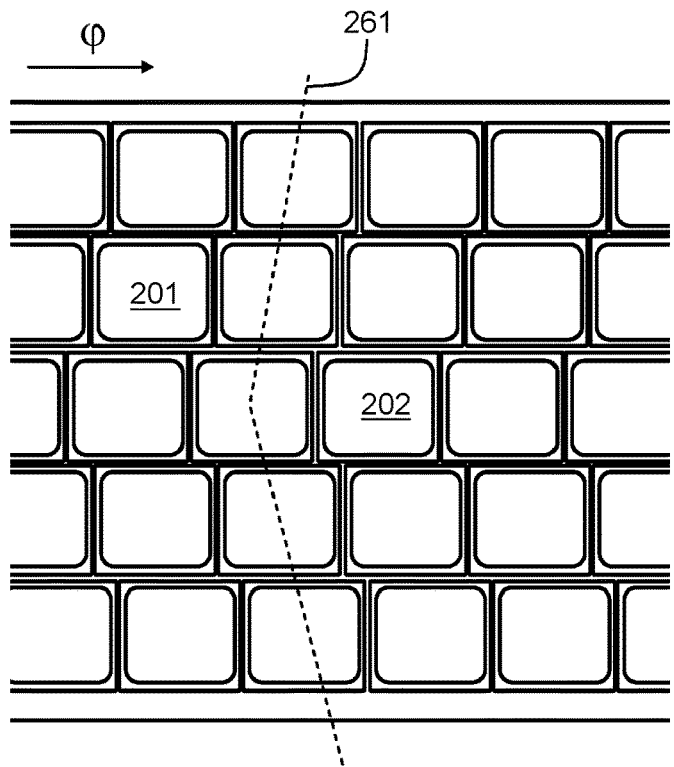
FIGS. 2a and 2b illustrate rotors according to exemplifying and non-limiting embodiments.
Figure 2B:
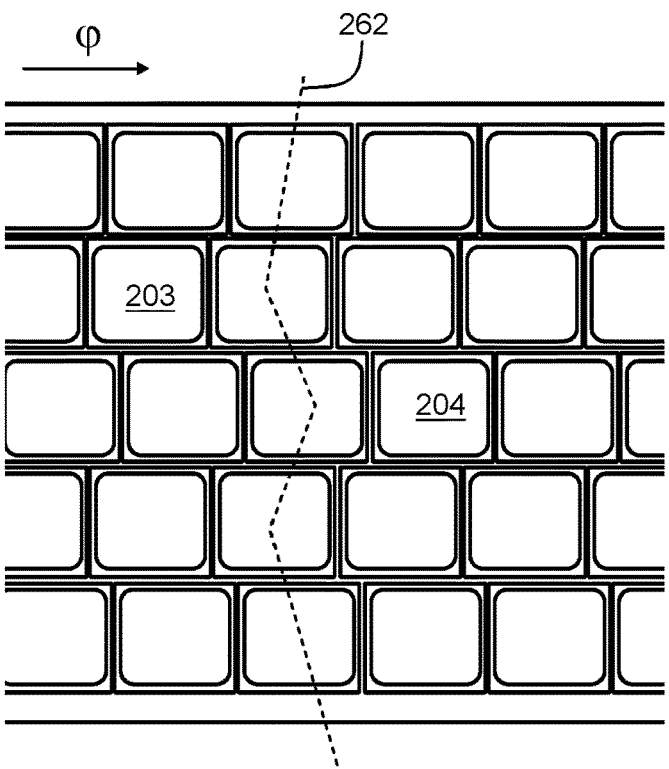

FIG. 2a illustrates a part of a rotor according to an exemplifying and non-limiting embodiment. The viewing direction related to FIG. 2a corresponds to the viewing direction related to FIG. 1b. Two of the permanent magnet modules are denoted with references 201 and 202. In this exemplifying case, the permanent magnet elements of the permanent magnet modules are arranged into V-shaped rows extending in the axial direction. The axial direction is parallel with the z-axis of a coordinate system 299. The V-shape is illustrated with a dashed polyline 261. FIG. 2b illustrates a part of a rotor according to another exemplifying and non-limiting embodiment. The viewing direction related to FIG. 2b corresponds to the viewing direction related to FIG. 1b. Two of the permanent magnet modules are denoted with references 203 and 204. In this exemplifying case, the permanent magnet elements of the permanent magnet modules are arranged into zigzag-shaped rows extending in the axial direction. The axial direction is parallel with the z-axis of a coordinate system 299. The zigzag-shape is illustrated with a dashed polyline 262.

In the exemplifying permanent magnet modules illustrated in FIGS. 1a, 1b, 1d, 1e, and 1f, the bottom section of each permanent magnet module comprises fastening edges for shape-locking the permanent magnet module under consideration in the radial and circumferential directions to between adjacent ones of the axially directed fastening rails as illustrated in FIGS. 1a, 1d, and 1e. In FIG. 1f, the fastening edges of the permanent magnet modules 102 and 105 are denoted with references 114 and 115. The fastening edge 114 comprises a flange section 116 and the fastening edge 115 comprises a flange section 117. The flange sections enable the axially directed fastening rails to press the permanent magnet module under consideration against the body part 119 of the rotor 118 as illustrated in FIGS. 1a, 1d, and 1e.

The exemplifying permanent magnet electric machine illustrated in FIGS. 1a-1e, is an inner rotor electric machine. The above-described principles for constructing a rotor of a permanent magnet electric machine are applicable on outer rotor electric machines, too. As shown in FIGS. 1a, 1d, and 1e, the permanent magnet modules are attached on the convex surface of the body part 119. In an outer rotor electric machine according to an exemplifying and non-limiting embodiment, permanent magnet modules according to an embodiment of the invention are attached on the concave surface of a body part of a rotor.

Figure 3:
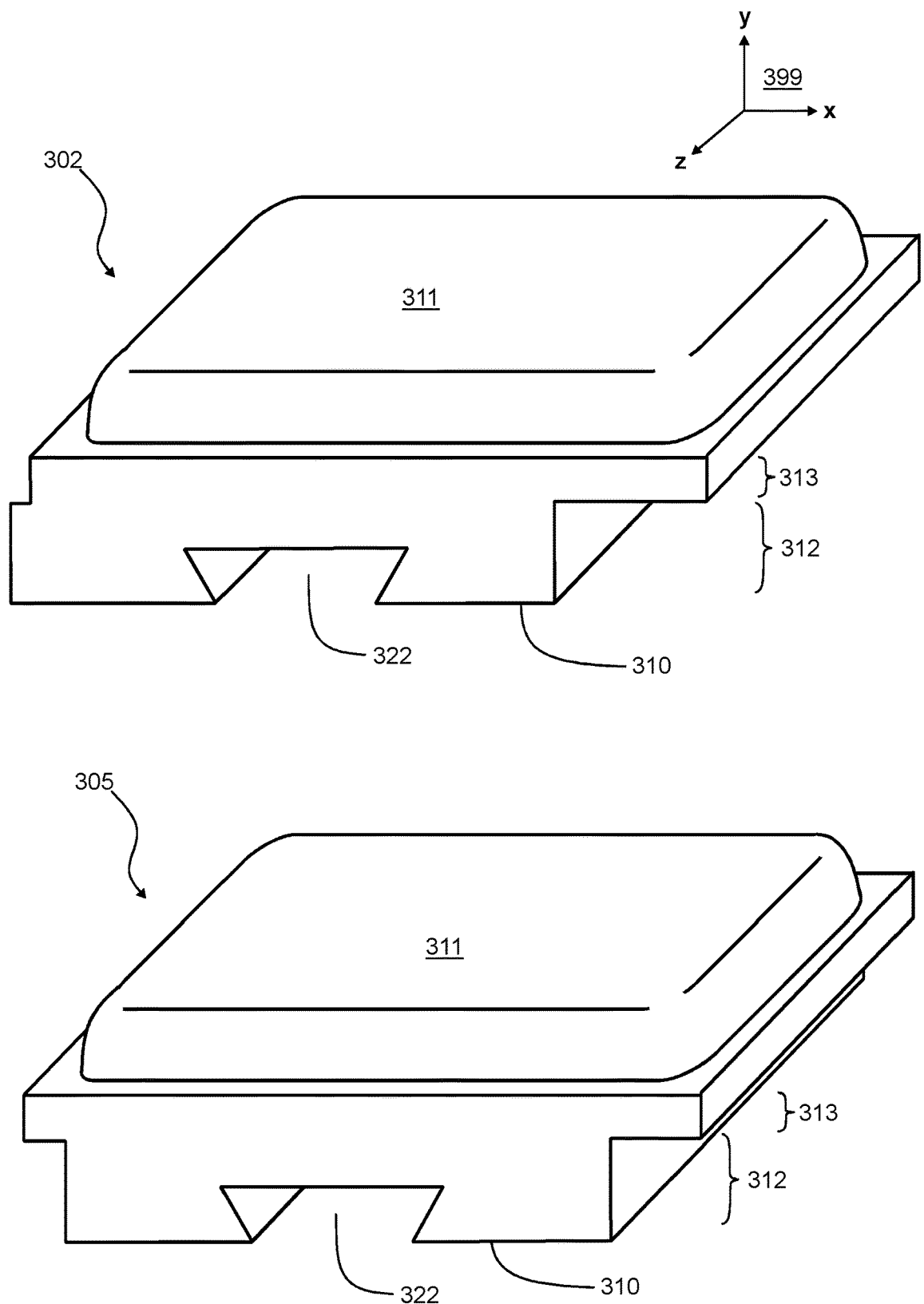
FIG. 3 illustrates permanent magnet modules according to an exemplifying and non-limiting embodiment.

FIG. 3 shows permanent magnet modules 302 and 303 according to an exemplifying and non-limiting embodiment. Each of the permanent magnet modules comprises a base-plate 310 and a permanent magnet element 311 attached to the base-plate. The base-plate comprises a bottom section 312 and an upper section 313 between the bottom section 312 and the permanent magnet element 311. The permanent magnet modules 302 and 303 differ from each other by the positions of the upper sections of the base-plates with respect to the bottom sections of the base-plates so that the permanent magnet elements of the permanent magnet modules are successive in the z-direction of a coordinate system 399 and at different positions in the x-direction of the coordinate system 399 when the bottom sections of the permanent magnet modules 302 and 305 are successive in the z-direction of the coordinate system 399 and aligned with each other in the x-direction of the coordinate system 399. In this exemplifying case, the bottom section 312 of each of the permanent magnet modules has a dovetail-shaped groove 322 so that the permanent magnet modules can be slid along fastening rails having a dovetail shaped cross-section. The permanent magnet modules can be attached to a body part of a rotor with means, e.g. bolts, for pulling the fastening rails towards the body part.

In the above-described exemplifying cases, the permanent magnet modules are slid along axially directed fastening rails that are used also for attaching the permanent magnet modules to the body part of the rotor. It is however also possible to use a temporarily mounted and removable installation device for axially sliding permanent magnet modules one-by-one into their final positions on a surface of a body part of a rotor, and thereafter to fasten each permanent magnet module to the body part with e.g. one or more bolts extending radially through the body part to the permanent magnet module under consideration. The principle that the bottom portions of the permanent magnet modules form axially directed straight rows even if the permanent magnet elements form rows deviating from the axial direction, can be helpful also in the cases where there are no axially directed fastening rails.

Figure 4:
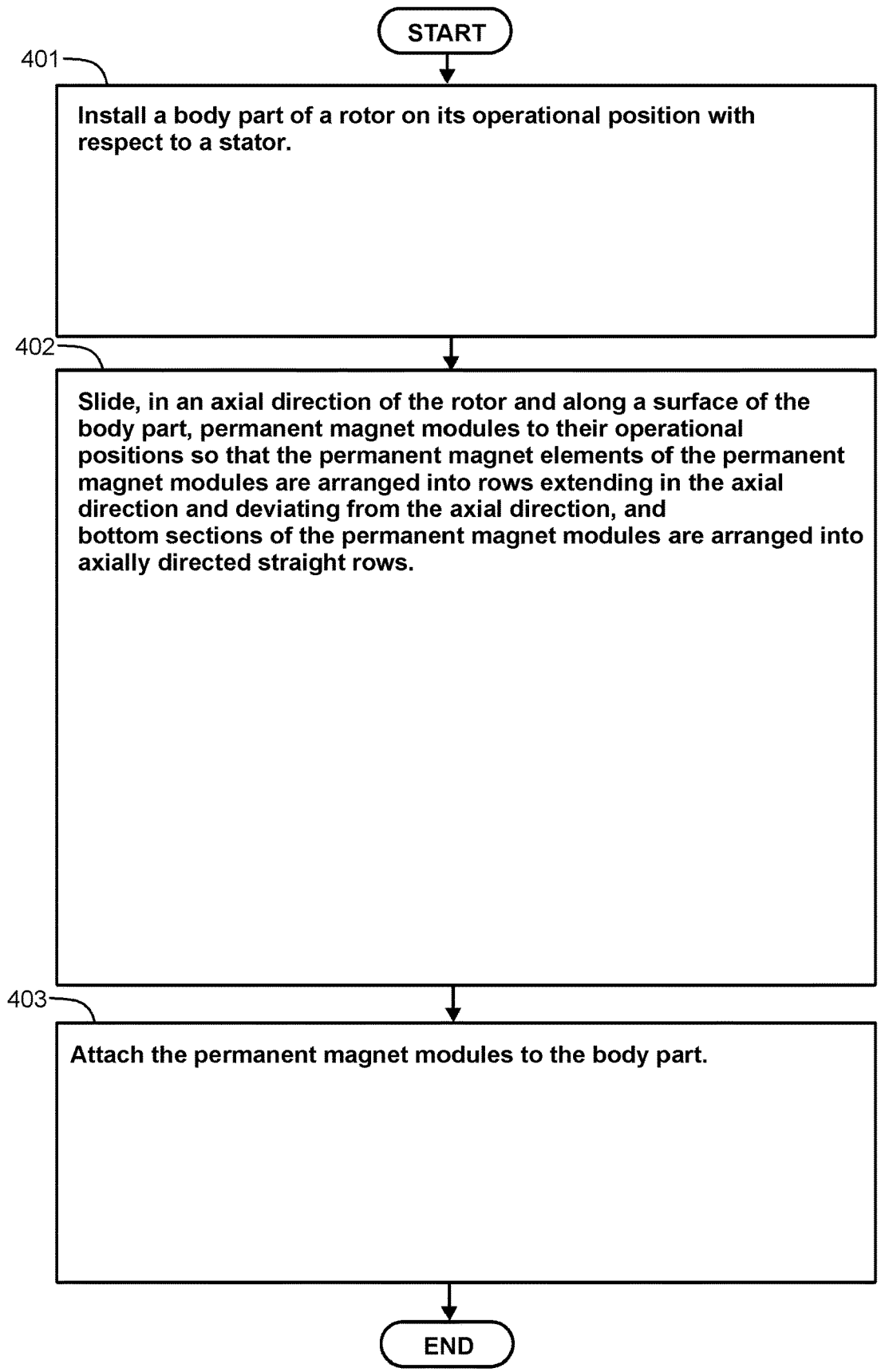
FIG. 4 shows a flowchart of a method according to an exemplifying and non-limiting embodiment for assembling a permanent magnet electric machine.

FIG. 4 shows a flowchart of a method according to an exemplifying and non-limiting embodiment for assembling a permanent magnet electric machine. The method comprises the following actions:

action 401: installing a body part of a rotor of the permanent magnet electric machine on an operational position where a surface of the body part faces radially towards an airgap surface of a stator of the permanent magnet electric machine, and subsequently action 402: sliding, in an axial direction of the rotor and along the surface of the body part, permanent magnet modules according to an embodiment of the invention to operational positions of the permanent magnet modules so that the permanent magnet elements of the permanent magnet modules are arranged into rows extending in the axial direction of the rotor and deviating from the axial direction of the rotor, and the bottom sections of the permanent magnet modules are arranged into axially directed straight rows, and action 403: attaching the permanent magnet modules to the body part.

In a method according to an exemplifying and non-limiting embodiment, the rotor comprises axially directed fastening rails located on the surface of the body part and attached to the body part. In this exemplifying case, the permanent magnet modules are slid along the axially directed fastening rails and attached to the body part by pulling the axially directed fastening rails towards the body part.

In a method according to an exemplifying and non-limiting embodiment, each of the axially directed fastening rails has a T-shaped cross-section so that the leg of the T-shaped cross-section is perpendicular to the surface of the body part.

In a method according to an exemplifying and non-limiting embodiment, the permanent magnet modules are attached to the body part by tightening threaded elements, e.g. bolts, extending radially through the body part to the axially directed fastening rails to make the axially directed fastening rails to press the permanent magnet modules against the body part.

In a method according to an exemplifying and non-limiting embodiment, the permanent magnet elements of the permanent magnet modules are arranged into the rows extending in the axial direction so that the rows are skewed with respect to the axial direction.

In a method according to an exemplifying and non-limiting embodiment, the permanent magnet elements are arranged into V-shaped rows extending in the axial direction.

In a method according to an exemplifying and non-limiting embodiment, the permanent magnet elements are arranged into zigzag-shaped rows extending in the axial direction.

The specific examples provided in the description given above should not be construed as limiting the scope and/or the applicability of the appended claims. Lists and groups of examples provided in the description given above are not exhaustive unless otherwise explicitly stated.

What is claimed is:

1. Permanent magnet modules for a rotor of a permanent magnet electric machine, each of the permanent magnet modules comprising:
   a base-plate; and
   a permanent magnet element attached to the base-plate, wherein the base-plate comprises a bottom section and an upper section between the bottom section and the permanent magnet element,
   wherein the permanent magnet modules constitute at least three subsets of the permanent magnet modules so that the permanent magnet modules of different ones of the subsets differ from each other by positions of the upper sections of the base-plates with respect to the bottom sections of the base-plates so that the permanent magnet elements of the permanent magnet modules of the different ones of the subsets are axially successive and circumferentially at different positions when the bottom sections of these permanent magnet modules are axially successive and circumferentially aligned with each other on a surface of a body part of the rotor.

2. The permanent magnet modules according to claim 1, wherein the bottom sections of the permanent magnet modules are shaped to enable the permanent magnet modules to be shape-locked in radial and circumferential directions to axially directed fastening rails located on the surface of the body part of the rotor and to enable the permanent magnet modules to be slid in an axial direction along the axially directed fastening rails.

3. The permanent magnet modules according to claim 2, wherein the bottom section of each of the permanent magnet modules comprises fastening edges for shape-locking the permanent magnet module under consideration in the radial and circumferential directions to between adjacent ones of the axially directed fastening rails.

4. The permanent magnet modules according to claim 3, wherein each of the fastening edges comprises a flange section enabling the axially directed fastening rails to press the permanent magnet module under consideration against the body part of the rotor.

5. A rotor for a permanent magnet electric machine, the rotor comprising:
   a body part having a shaft, and
   permanent magnet modules on a surface of the body part, wherein each of the permanent magnet modules comprises a base-plate and a permanent magnet element attached to the base-plate, the base-plate comprises a bottom section and an upper section between the bottom section and the permanent magnet element, and the permanent magnet modules constitute at least three subsets of the permanent magnet modules so that the permanent magnet modules of different ones of the subsets differ from each other by positions of the upper sections of the base-plates with respect to the bottom sections of the base-plates so that the permanent magnet elements of the permanent magnet modules of the different ones of the subsets are axially successive and circumferentially at different positions when the bottom sections of these permanent magnet modules are axially successive and circumferentially aligned with each other on the surface of the body part, and wherein the permanent magnet elements of the permanent magnet modules are arranged into rows extending in an axial direction of the rotor and deviating from the axial direction of the rotor, and the bottom sections of the permanent magnet modules are arranged into axially directed straight rows.

6. The rotor according to claim 5, wherein the rotor further comprises axially directed fastening rails located on the surface of the body part and attached to the body part, the bottom sections of the permanent magnet modules are shaped to enable the permanent magnet modules to be shape-locked in radial and circumferential directions to the axially directed fastening rails and to enable the permanent magnet modules to be slid in an axial direction along the axially directed fastening rails, and the axially directed fastening rails are arranged to press the permanent magnet modules against the body part.

7. The rotor according to claim 6, wherein each of the axially directed fastening rails has a T-shaped cross-section so that the leg of the T-shaped cross-section is perpendicular to the surface of the body part.

8. The rotor according to claim 6, wherein the rotor comprises threaded elements extending radially through the body part to the axially directed fastening rails and arranged to pull the axially directed fastening rails towards the body part to press the permanent magnet modules against the body part.

9. The rotor according to claim 5, wherein the permanent magnet elements are arranged into the rows extending in the axial direction so that the rows of the permanent magnet elements are skewed with respect to the axial direction.

10. The rotor according to claim 5, wherein the permanent magnet elements are arranged into V-shaped rows extending in the axial direction.

11. The rotor according to claim 5, wherein the permanent magnet elements are arranged into zigzag-shaped rows extending in the axial direction.

12. A permanent magnet electric machine comprising:
a stator, and
a rotor rotatably supported with respect to the stator, the rotor comprising a body part having a shaft and permanent magnet modules on a surface of the body part, wherein each of the permanent magnet modules comprises a base-plate and a permanent magnet element attached to the base-plate, the base-plate comprises a bottom section and an upper section between the bottom section and the permanent magnet element, and the permanent magnet modules constitute at least three subsets of the permanent magnet modules so that the permanent magnet modules of different ones of the subsets differ from each other by positions of the upper sections of the base-plates with respect to the bottom sections of the base-plates so that the permanent magnet elements of the permanent magnet modules of the different ones of the subsets are axially successive and circumferentially at different positions when the bottom sections of these permanent magnet modules are axially successive and circumferentially aligned with each other on the surface of the body part, and wherein the permanent magnet elements of the permanent magnet modules are arranged into rows extending in an axial direction of the rotor and deviating from the axial direction of the rotor, and the bottom sections of the permanent magnet modules are arranged into axially directed straight rows.

13. A method for assembling a permanent magnet electric machine, the method comprising:
installing a body part of a rotor of the permanent magnet electric machine on an operational position where a surface of the body part faces radially towards an airgap surface of a stator of the permanent magnet electric machine, and subsequently
sliding, in an axial direction of the rotor and along the surface of the body part, permanent magnet modules to operational positions of the permanent magnet modules, and
attaching the permanent magnet modules to the body part, wherein each of the permanent magnet modules comprises a base-plate and a permanent magnet element attached to the base-plate, the base-plate comprises a bottom section and an upper section between the bottom section and the permanent magnet element, and the permanent magnet modules constitute at least three subsets of the permanent magnet modules so that the permanent magnet modules of different ones of the subsets differ from each other by positions of the upper sections of the base-plates with respect to the bottom sections of the base-plates so that the permanent magnet elements of the permanent magnet modules of the different ones of the subsets are axially successive and circumferentially at different positions when the bottom sections of these permanent magnet modules are axially successive and circumferentially aligned with each other on the surface of the body part, and wherein the method comprises arranging the permanent magnet elements of the permanent magnet modules into rows extending in an axial direction of the rotor and deviating from the axial direction of the rotor, and arranging the bottom sections of the permanent magnet modules into axially directed straight rows.

14. The method according to claim 13, wherein the rotor comprises axially directed fastening rails located on the surface of the body part and attached to the body part, the bottom sections of the permanent magnet modules are shaped to enable the permanent magnet modules to be shape-locked in radial and circumferential directions to the axially directed fastening rails and to enable the permanent magnet modules to be slid in an axial direction along the axially directed fastening rails, and the method comprises sliding the permanent magnet modules along the axially directed fastening rails and attaching the permanent magnet modules to the body part by pulling the axially directed fastening rails towards the body part.

* * * * *